(12) United States Patent
Homma et al.

(10) Patent No.: US 10,048,436 B2
(45) Date of Patent: Aug. 14, 2018

(54) OPTICAL FIBER

(71) Applicant: SUMITOMO ELECTRIC INDUSTRIES, LTD., Osaka-shi, Osaka (JP)

(72) Inventors: Yuya Homma, Yokohama (JP); Kazuyuki Sohma, Yokohama (JP); Kensaku Shimada, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/806,873

(22) Filed: Nov. 8, 2017

(65) Prior Publication Data

US 2018/0128970 A1    May 10, 2018

(30) Foreign Application Priority Data

Nov. 8, 2016 (JP) .................................. 2016-218039

(51) Int. Cl.
| | |
|---|---|
| *G02B 6/02* | (2006.01) |
| *C03C 25/10* | (2018.01) |
| *C08G 18/24* | (2006.01) |
| *C08G 18/67* | (2006.01) |
| *C03C 25/1065* | (2018.01) |
| *C03C 25/105* | (2018.01) |

(52) U.S. Cl.
CPC ........ *G02B 6/02395* (2013.01); *C03C 25/105* (2013.01); *C03C 25/1065* (2013.01); *C08G 18/246* (2013.01); *C08G 18/673* (2013.01)

(58) Field of Classification Search
None
See application file for complete search history.

(56) References Cited

U.S. PATENT DOCUMENTS

| | | | | |
|---|---|---|---|---|
| 4,690,501 | A | * | 9/1987 | Zimmerman ......... C03C 25/106 385/141 |
| 5,219,896 | A | * | 6/1993 | Coady .................. C03C 25/106 522/90 |
| 5,416,880 | A | * | 5/1995 | Edwards ............... C03C 25/106 385/128 |
| 6,579,618 | B1 | * | 6/2003 | Ishikawa ............... C03C 25/106 385/145 |

(Continued)

FOREIGN PATENT DOCUMENTS

| | | |
|---|---|---|
| CN | 101268157 | 9/2008 |
| EP | 2 559 718 | 2/2013 |

(Continued)

*Primary Examiner* — Mike Stahl
(74) *Attorney, Agent, or Firm* — Drinker Biddle & Reath LLP

(57) ABSTRACT

An optical fiber includes an optical transmission medium having a core and a cladding; a primary resin layer disposed in contact with the optical transmission medium to coat the optical transmission medium; and a secondary resin layer coating the primary resin layer, wherein the primary resin layer comprises a cured product of an ultraviolet light curable resin composition comprising a urethane (meth) acrylate oligomer, a monomer and a photopolymerization initiator, and a compound containing phosphorus and tin as constituent atoms; and a Young's modulus of the primary resin layer is 0.5 MPa or less at 23° C.

12 Claims, 2 Drawing Sheets

(56) References Cited

U.S. PATENT DOCUMENTS

| | | | | |
|---|---|---|---|---|
| 6,849,333 B2* | 2/2005 | Schissel | ................ | C03C 25/106 385/123 |
| 2004/0014835 A1* | 1/2004 | Komiya | .............. | C03C 25/1055 522/90 |
| 2007/0258687 A1* | 11/2007 | Yamamoto | .......... | C03C 25/1065 385/128 |
| 2011/0038593 A1* | 2/2011 | Chien | ................. | C03C 25/1065 385/141 |
| 2013/0315545 A1* | 11/2013 | Saito | ....................... | C03C 25/50 385/102 |
| 2015/0071595 A1* | 3/2015 | Chen | .................... | C08G 18/672 385/123 |
| 2015/0131956 A1* | 5/2015 | Iwaguchi | ............ | C03C 25/1065 385/128 |
| 2015/0277031 A1* | 10/2015 | Bookbinder | ....... | G02B 6/02033 385/115 |
| 2015/0291724 A1 | 10/2015 | Kusano et al. | | |
| 2017/0242187 A1* | 8/2017 | Iwaguchi | ........... | G02B 6/02395 |

FOREIGN PATENT DOCUMENTS

| | | |
|---|---|---|
| JP | 2012-008221 | 1/2012 |
| JP | 2014-95923 A | 5/2014 |
| JP | 2014-132075 A | 7/2014 |
| JP | 2014-185320 | 10/2014 |
| WO | WO 00/64831 | 11/2000 |
| WO | WO 2006/025733 | 3/2006 |
| WO | WO 2008/076303 | 6/2008 |
| WO | WO 2011/049607 | 4/2011 |
| WO | WO-2014/168201 A1 | 10/2014 |

\* cited by examiner

OPTICAL FIBER

TECHNICAL FIELD

The present invention relates to optical fibers.

This application claims a priority based on Japanese Patent Application No. 2016-218039 filed on Nov. 8, 2016, and the entire content described in the Japanese Patent Application is incorporated.

BACKGROUND

Optical fibers generally include coating resin layers for protecting glass fibers which are optical transmission media. For example, JP 2014-132075 A and JP 2014-95923 A, and WO 2014/168201 A1 describe resin compositions for coating optical fibers containing urethane (meth)acrylate oligomers.

SUMMARY

To minimize an increase in transmission loss induced by micro bend generated when lateral pressure is applied to optical fibers, lateral pressure resistance has been required for the optical fibers. Moreover, in the case where the coating resin layer has a primary resin layer coating an optical transmission medium and a secondary resin layer coating the primary resin layer, a reduction in Young's modulus of the primary resin layer is required to improve the lateral pressure resistance.

The organotin compound, which is a catalyst for synthesizing a urethane (meth)acrylate oligomer, may be mixed with the resin composition used to form the coating resin layer. For this reason, a slight amount of tin derived from the organotin compound is contained in the coating resin layer formed by curing the resin composition. In the case where an organotin compound is contained in the coating resin layer, it also acts as a hydrolysis catalyst for urethane bond and ester bond under a hygrothermal environment, and it facilitates to progress degradation of the coating resin layer. Because the crosslinking density of the cured resin composition in a primary resin layer having a low Young's modulus, which has recently been desired in view of lateral pressure resistance, is low, the cured resin composition is susceptible to attacks from the moisture content. The attacks from the moisture content may cause hydrolysis and uneven scission of crosslinking of the primary resin, thereby generating stress concentrated points. When defects (voids) in the resin are generated in these parts, the voids will increase in size at low temperatures causing micro bends to occur in the optical transmission medium. Thus, the transmission loss of the optical fiber tends to increase.

Then, an object of the present invention is to provide an optical fiber having a low Young's modulus leading to high lateral pressure resistance, enabling prevention of the generation of voids even if the optical fiber is left under a hygrothermal environment for a long time, and minimizing an increase in transmission loss at low temperatures.

The optical fiber according to one aspect of the present invention includes an optical transmission medium having a core and a cladding, a primary resin layer disposed in contact with the optical transmission medium to coat the optical transmission medium, and a secondary resin layer coating the primary resin layer, wherein the primary resin layer comprises a cured product of an ultraviolet light curable resin composition comprising a urethane (meth) acrylate oligomer, a monomer and a photopolymerization initiator, and a compound containing phosphorus and tin as constituent atoms; and a Young's modulus of the primary resin layer is 0.5 MPa or less at 23° C.

According to the present invention, an optical fiber having a low Young's modulus leading to high lateral pressure resistance, enabling prevention of the generation of voids even if the optical fiber is left under a hygrothermal environment for a long time, and minimizing an increase in transmission loss at low temperatures can be provided.

DETAILED DESCRIPTION

Figure 1:
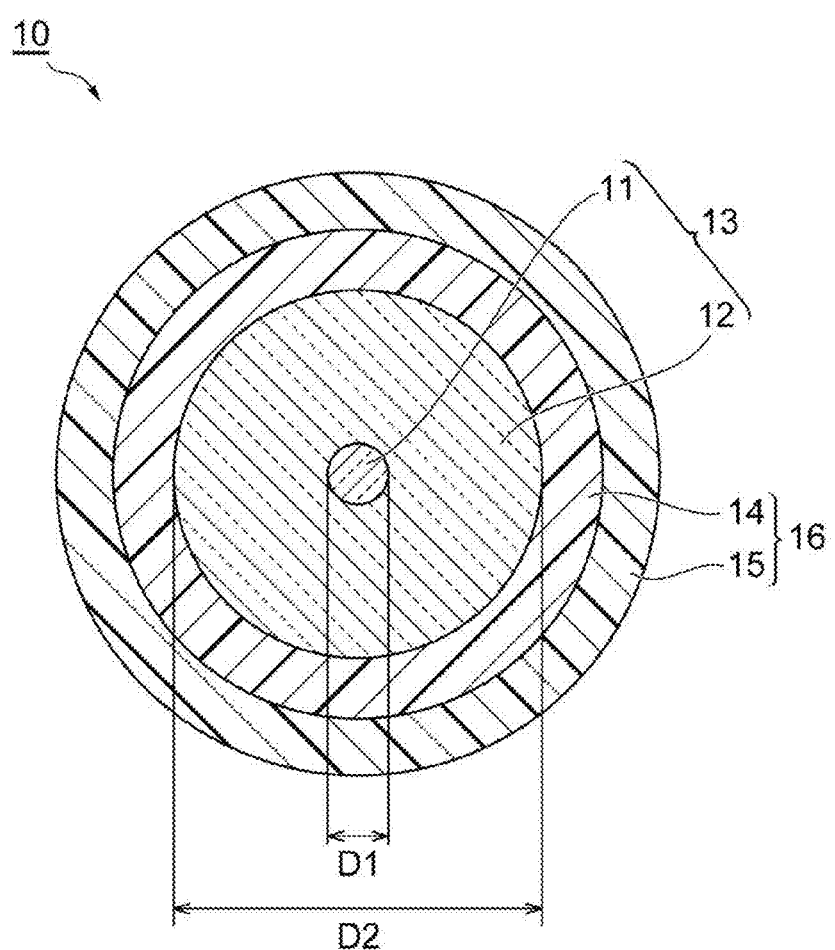
FIG. 1 is a schematic sectional view illustrating one example of the optical fiber according to the present embodiment.

[Description of Embodiment According to the Present Invention]

First, the content of the embodiment according to the present invention will be detailed and described. The optical fiber according to one aspect of the present invention includes an optical transmission medium having a core and a cladding, a primary resin layer disposed in contact with the optical transmission medium to coat the optical transmission medium, and a secondary resin layer coating the primary resin layer, wherein the primary resin layer comprises a cured product of an ultraviolet light curable resin composition (hereinafter also simply referred to as "resin composition") comprising a urethane (meth)acrylate oligomer, a monomer and a photopolymerization initiator, and a compound containing phosphorus and tin as constituent atoms; and a Young's modulus of the primary resin layer is 0.5 MPa or less at 23° C.

Tin (Sn) in the compound containing phosphorus and tin as constituent atoms is derived from an organotin compound used as a catalyst when the urethane (meth)acrylate oligomer is synthesized. The organotin compound is contained in the resin composition.

While the organotin compound is useful as a catalyst when the urethane (meth)acrylate oligomer is synthesized, it also has an action to promote hydrolysis of urethane bond and ester bond under a hygrothermal environment. In contrast, the present inventors have found that by converting the organotin compound in the primary resin layer to a compound containing a phosphorus atom and a tin atom in the same molecule, the activity of the organotin compound can be decreased to prevent hydrolysis even after the optical fiber is stored under a hygrothermal environment for a long time, and that then no voids are generated in the resin layer. Thus the present inventors have achieved the present invention.

The photopolymerization initiator may include 2,4,6-trimethylbenzoyldiphenylphosphine oxide. 2,4,6-Trimethylbenzoyldiphenylphosphine oxide brings about excellent quick curing properties of resins, and gives as byproduct after UV irradiation diphenylphosphinic acid, which can react with the organotin compound to thereby decrease the activity of the organotin compound.

The compound containing phosphorus and tin may be a reaction product between at least one phosphorus compound selected from the group consisting of a compound represented by formula (1a), a compound represented by formula (1b), and a compound represented by formula (1c); and an organotin compound. The phosphorus compounds below can react quickly with the organotin compound to decrease the activity of the organotin compound:

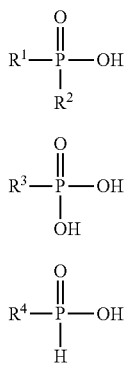

wherein $R^1$, $R^2$, $R^3$, and $R^4$ each independently represent an alkyl group, an alkenyl group, or an aryl group.

The phosphorus compound may comprise at least one selected from the group consisting of diphenylphosphinic acid, phenylphosphinic acid, and phenylphosphonic acid, because the activity of the organotin compound is easily decreased by their steric hindrance due to a phenyl group.

The organotin compound may comprise at least one selected from the group consisting of dibutyltin dilaurate and dibutyltin diacetate in view of availability and catalyst properties when the urethane (meth)acrylate oligomer is synthesized.

The difference between a glass transition temperature of the primary resin layer and a glass transition temperature of the secondary resin layer may be 150° C. or less. Thereby, low temperature properties of the optical fiber after heat cycles can be improved.

The Young's modulus of the primary resin layer may be 0.25 MPa or less at 23° C. Thereby, higher lateral pressure resistance of the optical fiber can be ensured.

The ultraviolet light curable resin composition may further comprise an amine compound. Thereby, the reaction between the phosphorus compound and the organotin compound can be promoted.

[Detailed Description of Embodiment According to the Present Invention]

Hereinafter, specific examples of the optical fiber according to an embodiment of the present invention will be described with reference to the drawings. The present invention will not be limited to these examples, but is defined by WHAT IS CLAIMED IS and intended to include all modifications within the meaning and scope of equivalency of WHAT IS CLAIMED IS. In the following description, identical reference numbers will be given to identical components in the description of drawings, and the duplication of description will be omitted.

(Optical Fiber)

FIG. 1 is a schematic sectional view illustrating one example of the optical fiber according to one embodiment of the present invention. An optical fiber 10 includes an optical transmission medium 13 having a core 11 and a cladding 12, and a coating resin layer 16 having a primary resin layer 14 and a secondary resin layer 15, disposed on the outer periphery of the optical transmission medium 13.

The cladding 12 surrounds the core 11. The core 11 and the cladding 12 mainly contain glass such as silica glass; for example, a silica to which germanium is added can be used as the core 11, and pure silica or a silica to which fluorine is added can be used as the cladding 12.

In FIG. 1, for example, the outer diameter (D2) of the optical transmission medium 13 is about 125 μm. The diameter (D1) of the core 11 forming the optical transmission medium 13 is about 7 to 15 μm. The coating resin layer 16 has at least a two-layered structure including the primary resin layer 14 and the secondary resin layer 15. The total thickness of the coating resin layer 16 is usually about 60 μm; the thicknesses of the primary resin layer 14 and the secondary resin layer 15 are substantially identical and the thickness of each layer is 20 to 40 μm. For example, the thickness of the primary resin layer 14 may be 35 μm and the thickness of the secondary resin layer 15 may be 25 μm. In the case where a large number of the optical fibers are bundled to make a cable, the coating diameter of the optical fiber is preferably thin. In this case, the total thickness of the coating resin layer 16 is preferably 30 to 40 μm. Each of the thickness of the primary resin layer and the thickness of the secondary resin layer may be 10 to 30 μm. Both are preferably almost the same.

The Young's modulus of the primary resin layer is 0.5 MPa or less at 23° C., preferably 0.3 MPa or less, more preferably 0.25 MPa or less. The lower limit value of the Young's modulus of the primary resin layer is not particularly limited, and is about 0.05 MPa. The Young's modulus of the primary resin layer can be measured by a pullout modulus test at 23° C.

By the way, a higher optical signal to noise ratio (OSNR) is required in the optical fiber to increase the channel capacity per core of a glass fiber by digital coherent communication techniques including multi-modulation technique. Examples of a method for improving the OSNR include a reduction in nonlinearity. For the reduction in nonlinearity, the effective cross-sectional area of the core of the glass fiber is increased as much as possible and low transmission loss is needed. However, the former, i.e., an increase in the effective cross-sectional area of the core means that the optical fiber becomes weak against lateral pressure. In particular, in the case where the effective cross-sectional area of the core exceeds 150 μm², it is preferable that the primary resin layer have a low Young's modulus of 0.25 MPa or less.

The primary resin layer 14 can be formed by curing an ultraviolet light curable resin composition comprising a urethane (meth)acrylate oligomer, a monomer, and a photopolymerization initiator.

Here, the term (meth)acrylate indicates acrylate or its corresponding methacrylate. The same is true of the term (meth)acrylic acid.

Examples of the urethane (meth)acrylate oligomer include oligomers obtained by reacting a polyol compound, a polyisocyanate compound, and a hydroxyl group-containing (meth)acrylate compound.

Examples of the polyol compound include polytetramethylene glycol, polypropylene glycol, and bisphenol A-ethylene oxide addition diol. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl acrylate, 2-hydroxybutyl acrylate, 1,6-hexanediol monoacrylate, pentaerythritol triacrylate, 2-hydroxypropyl acrylate, and tripropylene glycol diacrylate.

An organotin compound is used as a catalyst during synthesis of the urethane (meth)acrylate oligomer. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of availability and catalyst performance, it is preferable that dibutyltin dilaurate or dibutyltin diacetate be used as a catalyst.

A lower alcohol having 5 or less carbon atoms may be used during synthesis of the urethane (meth)acrylate oligomer. Examples of the lower alcohol having 5 or less carbon atoms used during synthesis of the urethane (meth)acrylate oligomer include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Hereinafter, preparation of the urethane (meth)acrylate oligomer will be described by reference to a specific example. For example, if polypropylene glycol as a polyol, isophorone diisocyanate as a polyisocyanate, 2-hydroxyethyl acrylate as a hydroxyl group-containing (meth)acrylate, and methanol as an alcohol are used, a urethane (meth)acrylate oligomer containing three reaction products shown below can be obtained:

(1) H-I-(PPG-I)n-H
(2) H-I-(PPG-I)n-Me
(3) Me-I-(PPG-I)n-Me where H represents the residue of 2-hydroxyethyl acrylate, I represents the residue of isophorone diisocyanate, PPG represents the residue of polypropylene glycol, Me represents the residue of methanol, and n represents an integer of 1 or more.

The reaction product (1) is a both-ends reactive oligomer and therefore, the crosslinking density of the cured resin composition is increased; however, the reaction product (2) is a one-end reactive oligomer; therefore, the reaction product (2) has the effect of reducing the crosslinking density of the cured resin composition, and can reduce the Young's modulus. The reaction product (3) is a both-ends non-reactive oligomer which causes no curing with ultraviolet light; therefore, it is preferable that preparation be performed such that the reaction product (3) is minimized. Alcohol other than methanol may be used to prepare a one-end non-reactive oligomer or a both-ends non-reactive oligomer.

When the urethane (meth)acrylate oligomer is synthesized, a silane coupling agent having a functional group reactive with the isocyanate group may be used. Examples of the silane coupling agent having a functional group reactive with the isocyanate group include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane, and 3-mercaptopropyltrimethoxysilane. If the polyol compound is reacted with the isocyanate compound, the hydroxyl group-containing (meth)acrylate compound and the silane coupling agent are used in combination in the state where an isocyanate group is present on both ends, and are reacted with the isocyanate group, a both-ends reactive oligomer and additionally a one-end silane coupling agent addition oligomer can be synthesized. As a result, because the oligomer can be reacted with glass, the adhesion between the optical transmission medium 13 and the primary resin layer 14 can be enhanced.

As a monomer, a monofunctional monomer having one polymerizable group, or a polyfunctional monomer having two or more polymerizable groups can be used. These monomers may be used in the form of a mixture thereof.

Examples of the monofunctional monomer include (meth) acrylate monomers such as methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth) acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth) acrylate, nonylphenoxypolyethylene glycol (meth)acrylate, and isobornyl (meth)acrylate; carboxyl group-containing monomers such as (meth)acrylic acid, (meth)acrylic acid dimers, carboxyethyl (meth)acrylate, carboxypentyl (meth) acrylate, and ω-carboxy-polycaprolactone (meth)acrylate; heterocycle-containing (meth)acrylates such as 3-(3-pyridyl)propyl (meth)acrylate, N-acryloylmorpholine, N-vinylpyrrolidone, N-vinylcaprolactam, N-acryloylpiperidine, N-methacryloylpiperidine, and N-acryloylpyrrolidine; maleimide monomers such as maleimide, N-cyclohexylmaleimide, and N-phenylmaleimide; N-substituted amide monomers such as (meth)acrylamide, N,N-dimethyl(meth) acrylamide, N,N-di ethyl (meth)acrylamide, N-hexyl(meth) acrylamide, N-methyl (meth)actyl amide, N-butyl(meth) acrylamide, N-butyl(meth)acrylamide, N-methylol(meth) acrylamide, and N-methylolpropane(meth)acrylamide aminoalkyl (meth)acrylate monomers such as aminoethyl (meth)acrylate, aminopropyl (meth)acrylate, N,N-dimethylaminoethyl (meth)acrylate, and t-butylaminoethyl (meth) acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxy pivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyl diol di(meth)acrylate, 3-ethyl-1,8-octanediol di(meth)acrylate, EO adducts di(meth)acrylate of bisphenol A, trimethylolpropane tri(meth)acrylate, trimethyloloctane tri(meth)acrylate, trimethylolpropanepolyethoxy tri(meth)acrylate, trimethylolpropanepolypropoxy tri(meth) acrylate, trimethylolpropanepolyethoxypolypropoxy tri (meth)acrylate, tris[(meth)acryloyloxyethyl] isocyanurate, pentaerythritol tri(meth)acrylate, pentaerythritolpolyethoxy tetra(meth)acrylate, pentaerythritolpolypropoxy tetra(meth) acrylate, pentaerythritol tetra(meth)acrylate, ditrimethylolpropane tetra(meth)acrylate, dipentaerythritol tetra(meth) acrylate, dipentaerythritol penta(meth)acrylate, dipentaerythritol hexa(meth)acrylate, and caprolactone-modified tris[(meth)acryloyloxyethyl] isocyanurate.

The photopolymerization initiator can be appropriately selected from known radical photopolymerization initiators. Examples of the photopolymerization initiator include 1-hydroxycyclohexylphenyl ketone, 2,2-dimethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholino-propan-1-one (Irgacure 907, manufactured by BASF SE), 2,4,6-trimethylbenzoyl-diphenylphosphine oxide (Irgacure TPO, manufactured by BASF SE), and bis(2,4,6-trimethylbenzoyl)phenylphosphine oxide (Irgacure 819, manufactured by BASF SE).

These photopolymerization initiators may be used in the form of a mixture thereof, and the photopolymerization initiator preferably comprises at least 2,4,6-trimethylbenzoyldiphenylphosphine oxide. 2,4,6-Trimethylbenzoyldiphenylphosphine oxide brings about excellent quick curing properties of resins, and gives as byproduct after UV irradiation diphenylphosphinic acid, which can react with the organotin compound to thereby decrease the activity of the organotin compound.

The compound containing phosphorus and tin is preferably a reaction product between at least one phosphorus compound selected from the group consisting of a compound represented by formula (1a), a compound represented by formula (1b), and a compound represented by formula (1c) mentioned above; and an organotin compound.

$R^1$, $R^2$, $R^3$, and $R^4$ each independently represent an alkyl group, an alkenyl group, or an aryl group. The alkyl group may be a linear, branched, or cyclic alkyl group having 1 to 30 carbon atoms. Examples of the alkyl group include a methyl group, an ethyl group, a propyl group, an n-butyl group, a tert-butyl group, a 2-ethylhexyl group, a 1,1,3,3-tetramethylbutyl group, and a cyclohexyl group. Examples of the alkenyl group include a vinyl group. Examples of the aryl group include a phenyl group.

At least one hydrogen atom constituting the alkyl group, the alkenyl group, or the aryl group may be replaced with a halogen atom, an alkoxy group, or a carboxyl group.

Examples of the compound represented by formula (1a) include dimethylphosphinic acid, diphenylphosphinic acid, bis(1,1,3,3-tetramethylbutyl) phosphinic acid, and 2-phenylphosphinopropanoic acid. Diphenylphosphinic acid is preferable as the compound represented by formula (1a) because the activity of the organotin compound can be decreased by its steric hindrance due to phenyl groups.

Examples of the compound represented by formula (1b) include ethylphosphonic acid, vinylphosphonic acid, n-butylphosphonic acid, 2-ethylhexylphosphonic acid, 3-bromopropylphosphonic acid, 3-methoxybutylphosphonic acid, phenylphosphonic acid, and 4-methoxyphenylphosphonic acid. Phenylphosphonic acid is preferable as the compound represented by formula (1b) because the activity of the organotin compound can be decreased by its steric hindrance due to a phenyl group.

Examples of the compound represented by formula (1c) include methylphosphinic acid and phenylphosphinic acid. Phenylphosphinic acid is preferable as the compound represented by formula (1c) because the activity of the organotin compound can be decreased by its steric hindrance due to a phenyl group.

The phosphorus compound may be added to the resin composition for forming the primary resin layer, or may be generated by irradiating the resin composition with ultraviolet light. In the latter case, for example, diphenylphosphinic acid can be generated by using a resin composition including 2,4,6-trimethylbenzoyldiphenylphosphine oxide as the photopolymerization initiator and irradiating the resin composition with ultraviolet light.

Examples of the compound containing phosphorus and tin include, but not particularly limited to, compounds represented by formula (2). The compound represented by formula (2) is an example of the reaction product between a compound represented by formula (1a) and an organotin compound:

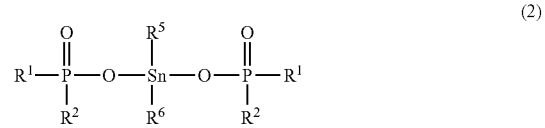

wherein $R^1$ and $R^2$ each independently represent an alkyl group, an alkenyl group, or an aryl group, and $R^5$ and $R^6$ each independently represent an alkyl group.

The resin composition for forming the primary resin layer may further comprise an amine compound. When the amine compound is contained, the reaction between the phosphorus compound and the organotin compound can be promoted. Examples of the amine compound include triethylamine, triphenylamine, triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate.

The resin composition may further comprise a silane coupling agent, a photo acid generator, a leveling agent, an antifoaming agent, or an antioxidant.

The silane coupling agent is not particularly limited as long as it does not obstruct curing of the ultraviolet light curable resin composition, and a variety of silane coupling agents including publicly known and used silane coupling agents can be used. Examples of the silane coupling agent include tetramethyl silicate, tetraethyl silicate, mereaptopropyltrimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl] disulfide, γ-trimethoxysilylpropyldimethylthiocarbamyl tetrasulfide, and γ-trimethoxysilylpropylbenzothiazyl tetrasulfide. By use of the silane coupling agent, the adhesion between the optical transmission medium 13 and the primary resin layer 14 can be controlled, or dynamic fatigue properties can be improved.

As the photo acid generator, an onium salt having a structure represented by $A^+B^-$ may be used. Examples of the photo acid generator include sulfonium salts such as UVACURE 1590 (manufactured by DAICEL-CYTEC Company, Ltd.), and CPI-100P and 110P (manufactured by San-Apro Ltd.); and iodonium salts such as IRGACURE 250 (manufactured by BASF SE), WPI-113 (manufactured by Wako Pure Chemical Industries, Ltd.), and Rp-2074 (manufactured by Rhodia Japan, Ltd.).

The secondary resin layer 15 can be formed, for example, by curing an ultraviolet light curable resin composition comprising a urethane (meth)acrylate oligomer, a monomer, and a photopolymerization initiator. The urethane (meth) acrylate oligomer, the monomer, and the photopolymerization initiator can be appropriately selected from those listed in the resin composition forming the primary resin layer. The resin composition forming the secondary resin layer has a composition different from that of the resin composition forming the primary resin layer.

The Young's modulus of the secondary resin layer is preferably 500 to 1400 MPa at 23° C., more preferably 800 to 1200 MPa. If the Young's modulus of the secondary resin layer is 500 MPa or more, the lateral pressure resistance is readily improved; if the Young's modulus of the secondary resin layer is 1400 MPa or less, the secondary resin layer has appropriate elongation at break; therefore, the secondary resin layer is difficult to break during removal of the coating, and has high coating removing properties.

The difference between the glass transition temperature of the primary resin layer and the glass transition temperature of the secondary resin layer is preferably 150° C. or less, and more preferably within the range from 120° C. to 150° C. When the difference in the glass transition temperatures is 150° C. or less, low temperature properties after thermal shock (heat cycles) are improved.

A colored layer, which serves as an ink layer, may be formed on the outer surface of the secondary resin layer 15 constituting the coating resin layer 16 in order to distinguish optical fibers. Alternatively, the secondary resin layer 15 may be formed so as to also serve as a colored layer.

The optical fiber according to the present embodiment may be subjected to a heat treatment at a temperature of 40° C. to 85° C. for about 12 to 72 hours. The heat treatment can promote the reaction between the phosphorus compound and the organotin compound. The optical fiber according to the present embodiment may be treated in an atmosphere containing $D_2$ (deuterium) in order to eliminate defects in the optical transmission medium, and when doing so, the heat treatment may be conducted simultaneously.

EXAMPLES

Hereinafter, the results of evaluation tests using Examples and Comparative Examples according to the present invention will be shown, and the present invention will be described more in detail. The present invention will not be limited to these Examples.

(Urethane (Meth)Acrylate Oligomer)

Urethane acrylate oligomer A was prepared by synthesis using polypropylene glycol having a molecular weight of 4000 as a polyol, isophorone diisocyanate as a polyisocyanate, 2-hydroxyethyl acrylate as a hydroxyl group-containing (meth)acrylate, and dibutyltin diacetate as a catalyst.

Urethane acrylate oligomer B was prepared by synthesis using polypropylene glycol having a molecular weight of 4000 as a polyol, isophorone diisocyanate as a polyisocyanate, 2-hydroxyethyl acrylate as a hydroxyl group-containing (meth)acrylate, methanol as an alcohol, and dibutyltin dilaurate as a catalyst.

Urethane acrylate oligomer C was prepared by synthesis using polypropylene glycol having a molecular weight of 1000 as a polyol, isophorone diisocyanate as a polyisocyanate, 2-hydroxyethyl acrylate as a hydroxyl group-containing (meth)acrylate, and dibutyltin dilaurate as a catalyst.

(Resin Composition for Primary Resin Layer)

Resin compositions for a primary resin layer having the compositions (parts by mass) shown in Tables 1 and 2 were each prepared.

(Resin Composition for Secondary Resin Layer)

The resin compositions for a secondary resin layer having the compositions (parts by mass) shown in Table 1 and Table 2 were each prepared.

[Preparation of Optical Fiber 10]

A primary resin layer 14 having a thickness of 35 μm was formed using a resin composition for a primary resin layer on the outer periphery of an optical transmission medium 13 including a core and a cladding, and having an outer diameter (D2) of 125 μm and an effective cross-sectional area of the core of 150 μm$^2$; and a secondary resin layer 15 having a thickness of 25 μm was further formed on the outer periphery using the resin composition for a secondary resin layer to prepare an optical fiber 10. Further, the optical fiber 10 was subjected to a heat treatment under conditions shown in Table 1 or Table 2.

[Evaluation of Optical Fiber 10]

The resulting optical fibers were subjected to the following evaluation tests. The results are shown in Tables 1 and 2.

(Elementary Analysis)

The optical fiber prepared was immersed in methyl ethyl ketone to treat at 60° C. for 14 hours, to thereby extract non-crosslinked components. Then, methyl ethyl ketone was removed by an evaporator, and the residue was dissolved in methanol. The insoluble matter produced at that time was filtered off, and subjected to ICP emission spectrometry to confirm whether phosphorus atoms and tin atoms were detected therein. In all of Examples 1 to 11, insoluble matter was produced, in which phosphorus atoms and tin atoms were detected. In Comparative Examples 1 and 2, no compound including a phosphorus atom was contained, and therefore no insoluble matter was produced in evaluation in the first place. In Comparative Example 3, as in Examples 1 to 11, insoluble matter was produced, in which phosphorus atoms and tin atoms were detected.

(Young's Modulus of Primary Resin Layer)

The Young's modulus of the primary resin layer was measured by a pullout modulus test at 23° C. Specifically, a coating resin layer 16 of the optical fiber 10 was cut with a razor to cut out the coating resin layer 16, and the coating resin layer 16 (primary resin layer 14 and secondary resin layer 15) was fixed and the optical transmission medium 13 was pulled off. The stress of the primary resin layer 14 was determined from the amount of elastic deformation of the primary resin layer 14 before the optical transmission medium 13 was pulled out and the force pulling the optical transmission medium 13.

(Glass Transition Temperature (Tg))

Determination of Tg was conducted as follow. First, the optical fiber 10 was immersed in ethanol, and the coating resin layer 16 (the primary resin layer 14 and the secondary resin layer 15) in a tubular form was pulled out. Then, the coating resin layer 16 was dried in vacuo to remove ethanol therefrom, and measurement of dynamic viscoelasticity of the resultant was carried out under the conditions of a rate of temperature rise of 5° C./min and a frequency of 11 Hz. The temperature values of the two peak tops of tan δ measured were taken as Tg of the primary resin layer 14 and Tg of the secondary resin layer 15, and the difference between the temperature values of the peak tops was taken as the difference between Tg of the primary resin layer 14 and Tg of the secondary resin layer 15.

(Lateral Pressure Resistance)

Figure 2B:
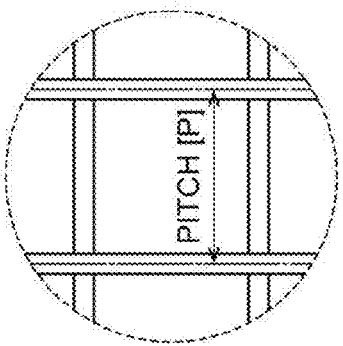
FIG. 2B is a partially enlarged view of a portion in FIG. 2A.
Figure 2A:
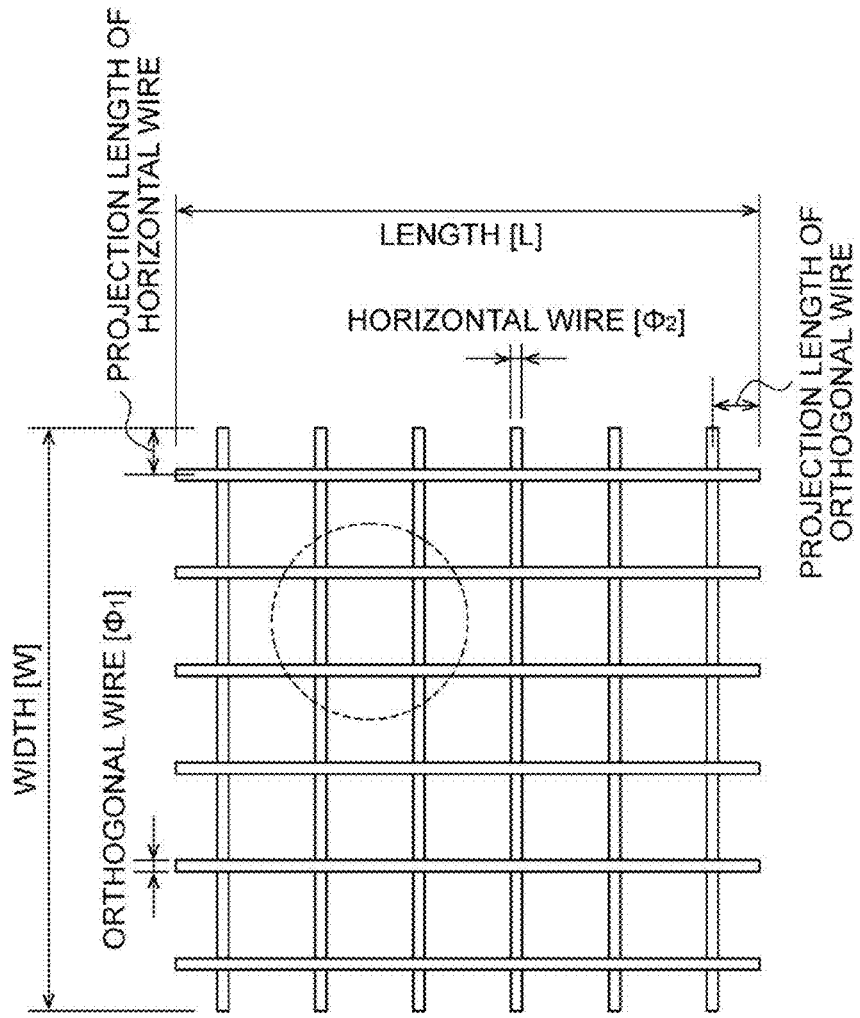
FIG. 2A is a diagram illustrating a configuration of a metal mesh material used in a mesh lateral pressure test.

The lateral pressure resistance of the optical fiber was evaluated by a lateral pressure test. FIG. 2A is a diagram illustrating the configuration of a metal mesh material 30 used in the lateral pressure test, and FIG. 2B is a partially enlarged view of the portion in FIG. 2A. As illustrated in FIGS. 2A and 2B, the metal mesh material 30 has a mesh shape composed of several metal wires extending horizontally and orthogonally. The diameter φ1 of the orthogonal wire and the diameter φ2 of the horizontal wire are 50 μm, the pitch P between center lines of orthogonal wires and that between center lines of horizontal lines are 150 μm. The projection length L1 of the orthogonal wire is 100 μm, and the projection length L2 of the horizontal line is 100 μm.

The lateral pressure test was performed by determining the difference between the transmission loss of signal light at a wavelength of 1550 nm when the optical fiber was wound around a bobbin (diameter of the body: 280 mm) having the metal mesh material 30 illustrated in FIGS. 2A and 2B wound around the body and the transmission loss when the optical fiber was loosely formed into a bundle without wound around the bobbin. The optical fiber was ranked as A when the difference in transmission loss was less than 0.6 dB/km, as B when the difference was 0.6 dB/km or more and less than 1.0 dB/Ion, and as C when the difference was 1.0 dB/km or more; a rank equal to B or higher was considered acceptable.

(Low Temperature Properties after Hygrothermal Degradation)

In the optical fibers degraded at 85° C. and 85% RH for 180 days, the transmission properties of signal light having a wavelength of 1550 nm were measured under two temperature conditions at 23° C. and −40° C. to determine the transmission loss at 23° C. and that at −40° C. The optical fiber was ranked as A if the difference in transmission loss obtained by subtracting the transmission loss at 23° C. from the transmission loss at −40° C. was less than 0 dB/km (the transmission loss at −40° C. is smaller), as B if the difference was 0 dB/km or more and less than 0.01 dB/km, and as C if the difference was 0.01 dB/km or more. A rank equal to B or higher was considered acceptable.

(Heat Cycle Test)

In the optical fibers that had undergone 50 heat cycles between −40° C. and 23° C. (keeping at each temperature for 1 hour; transition time of 60 min.), the transmission properties of signal light having a wavelength of 1550 nm were measured under two temperature conditions at 23° C. and −40° C. to determine the transmission loss at 23° C. and that at −40° C. The optical fiber was ranked as A if the difference in transmission loss obtained by subtracting the transmission loss at 23° C. from the transmission loss at −40° C. was less than 0 dB/km (the transmission loss at −40° C. is smaller), as B if the difference was 0 dB/km or more and less than 0.01 dB/km, and as C if the difference was 0.01 dB/km or more. A rank equal to B or higher was considered acceptable.

TABLE 1

| | Examples | | | | | | |
|---|---|---|---|---|---|---|---|
| | 1 | 2 | 3 | 4 | 5 | 6 | 7 |
| Resin composition for primary resin layer | | | | | | | |
| Urethane acrylate oligomer A | 70.5 | — | — | — | — | — | — |
| Urethane acrylate oligomer B | — | 68.5 | 69.5 | 70.5 | 71 | 70.5 | 71 |
| Isobornyl acrylate | 10 | 10 | 10 | 10 | 10 | 10 | 10 |
| N-Vinylcaprolactam | 10 | 10 | 10 | 10 | 10 | 10 | 10 |
| Nonylphenoxypolyethylene glycol acrylate | 6 | 6 | 6 | 6 | 6 | 6 | 6 |
| 1,6-Hexanediol diacrylate | 1 | 3 | 2 | 1 | 0.5 | 1 | 1 |
| Irgacure TPO | 1 | 1 | 1 | 1 | 1 | 1 | 1 |
| Diethylamine | 0.5 | 0.5 | 0.5 | 0.5 | 0.5 | 0.5 | — |
| Mercaptopropyltrimethoxysilane | 1 | 1 | 1 | 1 | 1 | 1 | 1 |
| Resin composition for secondary resin layer | | | | | | | |
| Urethane acrylate oligomer C | 60 | 60 | 60 | 60 | 60 | 60 | 60 |
| Isobornyl acrylate | 19 | 19 | 19 | 19 | 19 | 19 | 19 |
| Trimethylolpropane triacrylate | 20 | 20 | 20 | 20 | 20 | 20 | 20 |
| Irgacure TPO | 1 | 1 | 1 | 1 | 1 | 1 | 1 |
| Difference in Tg (° C.) | 148 | 146 | 146 | 145 | 145 | 145 | 145 |
| Heat treatment Temperature (° C.) | 40 | 40 | 40 | 40 | 40 | 85 | 40 |
| Heat treatment Time (h) | 12 | 12 | 12 | 12 | 12 | 72 | 12 |
| Compound containing phosphorus and tin | yes | yes | yes | yes | yes | yes | yes |
| Young's modulus of primary resin layer (MPa) | 0.50 | 0.28 | 0.23 | 0.11 | 0.07 | 0.11 | 0.11 |
| Lateral pressure resistance | B | B | A | A | A | A | A |
| Low temperature properties after hygrothermal degradation | A | A | A | A | A | A | B |
| Heat cycle test | A | A | A | A | A | A | A |

TABLE 2

|  | Examples | | | | Comparative Examples | | |
| --- | --- | --- | --- | --- | --- | --- | --- |
|  | 8 | 9 | 10 | 11 | 1 | 2 | 3 |
| Resin composition for primary resin layer | | | | | | | |
| Urethane acrylate oligomer A | — | — | — | 70.5 | — | — | 70 |
| Urethane acrylate oligomer B | 69.5 | 69.5 | 69.5 | — | 70 | 70 | — |
| Isobornyl acrylate | 10 | 10 | 10 | 10 | 10 | 10 | 10 |
| N-Vinylcaprolactam | 10 | 10 | 10 | 10 | 10 | 10 | 10 |
| Nonylphenoxypolyethylene glycol acrylate | 6 | 6 | 6 | 6 | 6 | 6 | 6 |
| 1,6-Hexanediol diacrylate | 1 | 1 | 1 | 1 | 1 | 1 | 2 |
| Irgacure TPO | — | — | — | 1 | — | — | 1 |
| Irgacure 907 | 2 | 2 | — | — | 2 | — | — |
| Irgacure 184 | — | — | 2 | — | — | 3 | — |
| Diphenylphosphinic acid | 0.5 | — | — | — | — | — | — |
| Phenylphosphinic acid | — | 0.5 | — | — | — | — | — |
| Phenylphosphonic acid | — | — | 0.5 | — | — | — | — |
| Diethylamine | — | — | — | 0.5 | — | — | — |
| Mercaptopropyltrimethoxysilane | 1 | 1 | 1 | 1 | 1 | 1 | 1 |
| Resin composition for secondary resin layer | | | | | | | |
| Urethane acrylate oligomer C | 60 | 60 | 60 | 50 | 60 | 60 | 60 |
| Isobornyl acrylate | 19 | 19 | 19 | 19 | 19 | 19 | 19 |
| Trimethylolpropane triacrylate | 20 | 20 | 20 | 30 | 20 | 20 | 20 |
| Irgacure TPO | 1 | 1 | 1 | 1 | 1 | 1 | 1 |
| Difference in Tg (° C.) | 145 | 145 | 145 | 155 | 145 | 145 | 148 |
| Heat treatment Temperature (° C.) | 40 | 40 | 40 | 40 | 40 | 40 | 40 |
| Heat treatment Time (h) | 12 | 12 | 12 | 12 | 12 | 12 | 12 |
| Compound containing phosphorus and tin | yes | yes | yes | yes | no | no | yes |
| Young's modulus of primary resin layer (MPa) | 0.13 | 0.13 | 0.12 | 0.50 | 0.13 | 0.12 | 0.53 |
| Lateral pressure resistance | A | A | A | B | A | A | C |
| Low temperature properties after hygrothermal degradation | B | B | B | A | C | C | B |
| Heat cycle test | A | A | A | C | A | A | A |

It was able to be verified that the optical fibers prepared in the Examples had superior lateral pressure resistance and low temperature properties after hygrothermal degradation. It was also able to be verified that when the difference between the glass transition temperature of the primary resin layer and the glass transition temperature of the secondary resin layer is 150° C. or less, low temperature properties after heat cycles is better.

What is claimed is:

1. An optical fiber including:
   an optical transmission medium having a core and a cladding;
   a primary resin layer disposed in contact with the optical transmission medium to coat the optical transmission medium; and
   a secondary resin layer coating the primary resin layer,
   wherein the primary resin layer comprises a cured product of an ultraviolet light curable resin composition comprising a urethane (meth)acrylate oligomer, a monomer and a photopolymerization initiator, and a compound containing phosphorus and tin as constituent atoms; and
   a Young's modulus of the primary resin layer is 0.25 MPa or less at 23° C.

2. The optical fiber according to claim 1, wherein the photopolymerization initiator comprises 2,4,6-trimethylbenzoyldiphenylphosphine oxide.

3. The optical fiber according to claim 1, wherein the compound containing phosphorus and tin is a reaction product between at least one phosphorus compound selected from the group consisting of a compound represented by formula (1a), a compound represented by formula (1b), and a compound represented by formula (1c); and an organotin compound:

wherein $R^1$, $R^2$, $R^3$, and $R^4$ each independently represent an alkyl group, an alkenyl group, or an aryl group.

4. The optical fiber according to claim 3, wherein the phosphorus compound comprises at least one selected from the group consisting of diphenylphosphinic acid, phenylphosphinic acid, and phenylphosphonic acid.

5. The optical fiber according to claim 3, wherein the organotin compound comprises at least one selected from the group consisting of dibutyltin dilaurate and dibutyltin diacetate.

6. The optical fiber according to claim 1, wherein a difference between a glass transition temperature of the primary resin layer and a glass transition temperature of the secondary resin layer is 150° C. or less.

7. An optical fiber including:

an optical transmission medium having a core and a cladding;

a primary resin layer disposed in contact with the optical transmission medium to coat the optical transmission medium; and a secondary resin layer coating the primary resin layer, wherein the primary resin layer comprises a cured product of an ultraviolet light curable resin composition comprising a urethane (meth)acrylate oligomer, a monomer, a photopolymerization initiator and an amine compound, and a compound containing phosphorus and tin as constituent atoms; and a Young's modulus of the primary resin layer is 0.5 MPa or less at 23° C.

8. The optical fiber according to claim 7, wherein the photopolymerization initiator comprises 2,4,6-trimethylbenzoyldiphenylphosphine oxide.

9. The optical fiber according to claim 7, wherein the compound containing phosphorus and tin is a reaction product between at least one phosphorus compound selected from the group consisting of a compound represented by formula (1a), a compound represented by formula (1b), and a compound represented by formula (1c); and an organotin compound:

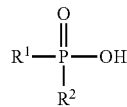

(1a)

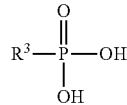

(1b)

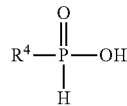

(1c)

wherein $R^1, R^2, R^3$, and $R^4$ each independently represent an alkyl group, an alkenyl group, or an aryl group.

10. The optical fiber according to claim 9, wherein the phosphorus compound comprises at least one selected from the group consisting of diphenylphosphinic acid, phenylphosphinic acid, and phenylphosphonic acid.

11. The optical fiber according to claim 9, wherein the organotin compound comprises at least one selected from the group consisting of dibutyltin dilaurate and dibutyltin diacetate.

12. The optical fiber according to claim 7, wherein a difference between a glass transition temperature of the primary resin layer and a glass transition temperature of the secondary resin layer is 150° C. or less.

* * * * *